United States Patent [19]
Winter et al.

[11] Patent Number: 6,040,927
[45] Date of Patent: *Mar. 21, 2000

[54] COLOR HALFTONING OPTIONS INFLUENCED BY PRINT-MODE SETTING

[75] Inventors: Kirt Alan Winter, Escondido; Thomas G. Smith, San Diego, both of Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/759,399

[22] Filed: Dec. 4, 1996

Related U.S. Application Data

[63] Continuation of application No. 08/187,933, Jan. 27, 1994, abandoned.

[51] Int. Cl.[7] .................................................. H04N 1/40
[52] U.S. Cl. ............................................................ 358/534
[58] Field of Search .................................. 358/534–536, 358/462, 429, 453, 456–461

[56] References Cited

U.S. PATENT DOCUMENTS

| | | | |
|---|---|---|---|
| 5,073,953 | 12/1991 | Westdijk | 358/462 |
| 5,075,788 | 12/1991 | Funada | 358/462 |
| 5,225,911 | 7/1993 | Buckley | 358/462 |

OTHER PUBLICATIONS

DeskJet 500C–Printer for Personal Computers Software Information Guide, Hewlett–Packard Co., Sep. 1991.

*Primary Examiner*—Thomas D. Lee
*Assistant Examiner*—Stephen Brinich

[57] ABSTRACT

Different print quality modes in a printer such as a color inkjet printer invoke different print rendering options for a particular object to be printed. In an exemplary embodiment, a printer control automatically invokes an error diffusion haltoning technique for photo images whenever high quality mode is designated, and automatically invokes a dither haltoning technique for photo images whenever a normal or fast print mode is designated.

31 Claims, 14 Drawing Sheets

51
The user wants to create
a "compound" page, with
a photograph, a pie chart
and text (black & color).

PHOTO — 41

52
Using a color-enabled software
desktop publishing application, the
user selects the text and graphics,
scans in the photograph and lays
out the page, specifying colors for
the pie chart and color text.

CHART

TEXT

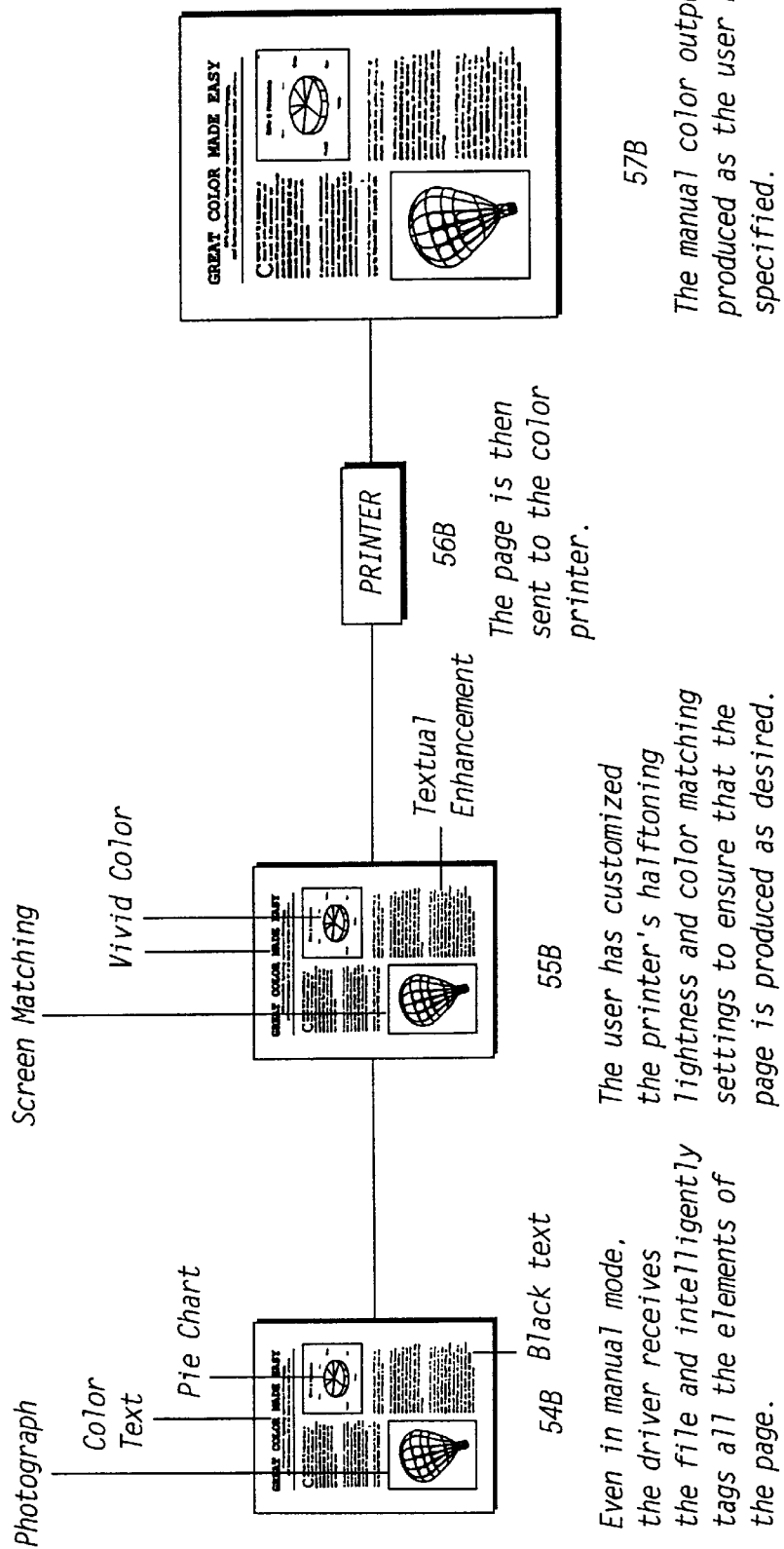

COLOR HALFTONING OPTIONS INFLUENCED BY PRINT-MODE SETTING

RELATED APPLICATIONS

This is a file-wrapper continuation of Ser. No. 08/187,933, filed Jan. 27, 1994, and now abandoned.

Related applications which are assigned to the assignee of the present application and incorporated here by reference as follows: Atty Docket 1094206-1 entitled ADAPTIVE COLOR RENDERING BY AN INKJET PRINTER BASED ON OBJECT TYPE, filed concurrently herewith in the names of Thomas G. Smith, et al., Ser. No. 08/189,006; Atty Docket 1094220-1 entitled MANUAL/AUTOMATIC USER OPTION FOR COLOR PRINTING OF DIFFERENT TYPES OF OBJECTS, filed concurrently herewith in the names of Sachin S. Naik, et al., Ser. No. 08/187,942; Atty Docket 1094173-1 entitled COLOR DIGITAL HALFTONING USING COLOR VECTOR DITHERING, filed concurrently herewith in the names of Alexander Perumal, Jr., et al., Ser. No. 08/187,935; Atty Docket 1094230-1 entitled COLOR DIGITAL HALFTONING USING COLOR VECTOR DITHERING AND BLACK AND SECONDARY COLOR REPLACEMENT, filed concurrently herewith in the names of Alexander Perumal, Jr., et al, Ser. No. 08/189,541; Atty Docket 1094210-1 entitled BI-LEVEL DIGITAL COLOR PRINTER SYSTEM EXHIBITING IMPROVED UNDERCOLOR REMOVAL AND ERROR DIFFUSION PROCEDURES, filed concurrently herewith in the names of Gary Dispoto, et al. Ser. No. 08/182,567; Atty Docket 1094120-1 entitled AUTOMATED OPTIMIZATION OF HARDCOPY OUTPUT, filed concurrently herewith in the names of Steven O. Miller, et al., Ser. No. 08/188,618; HALFTONE IMAGES USING PRINTED SYMBOLS MODELLING, filed May 3, 1993 in the name of Qian Lin, Ser. No. 08/57,244; and HALFTONE IMAGES USING SPECIAL FILTERS, filed May 11, 1993 in the name of Qian Lin, Serial No. 08/60,285.

BACKGROUND OF THE INVENTION

This invention relates generally to color printing, and more specifically to printing different types of color objects in the same printout.

The use of color monitors for computers has accelerated the need for color printers which can produce a satisfactory printout of what is displayed on the screen. Part of the problem arises from the subjective nature of color. Color is a sensation produced by the combined effects of light, objects and human vision. A particular color or combination of colors may be appealing to one person while at the same time being offensive to another.

Another part of the problem arises from the different color technologies used in computer monitors and color printers. For example, computer monitors are based on a color gamut of red, green and blue pixels (RGB) while color printers such as inkjet printers are typically based on a color gamut of cyan, magenta, yellow and black (CMYK). The RGB color components of computer monitors are combined together in an "additive" way by mixing red, green and blue light rays to form a first variety of different colors, while the CMYK components of color inks are applied to media in different combinations in a "subtractive" way to form a second variety of different colors. A number of different color management techniques have been used on order to provide some form of matching between the colors viewed on a computer monitor and the colors printed by a specific printer using a given ink formula on a particular type of media. Such color management techniques have also employed different types of halftoning in order to improve the color output of printers.

Desktop publishing software programs have created additional problems by allowing different types of objects to be combined together into a composite document, such as photographic images, business graphics (e.g., charts), and scalable text in both color and black. By skewing the printer color output to ensure satisfactory color printing of photographic images, the business graphics in the same document often appear washed out and lose their impact. By skewing the printer color output to ensure satisfactory color printing of saturated vivid colors for business graphics, the photographic image in the same document loses its lifelike appearance.

Some of the aforementioned color printing problems have been partially solved by providing manually controlled printer settings to get the best results available. In addition, sophisticated users who demand exact color matching between screen and printout have obtained some solutions through color management software incorporated in the computer operating system as well as color management software incorporated into third party software applications. Also, some color matching technology has been incorporated into printer drivers which provide the translation interface between a particular computer and/or software application running in the computer and a color printer which acts as a hardcopy output device.

However, there is a need for better color management technology which allows for either automatic or customized settings respecting color correction as well as halftoning, and which allows different color schemes to be used for different types of objects such as photo images, business graphics, color text, and black text.

BRIEF SUMMARY OF THE INVENTION

A method for providing alternative halftone techniques used for the same types of objects to be printed, wherein different print quality modes automatically invoke different print rendering options for a particular object to be printed. As implemented in a color printer system, a printer control automatically invokes a first halftone technique such as error diffusion for photo images whenever a high quality print mode is designated, and automatically invokes a second halftone technique such as a dither whenever other print modes such as normal or fast is designated.

DETAILED DESCRIPTION OF THE BEST MODE OF THE INVENTION

Figure 1:
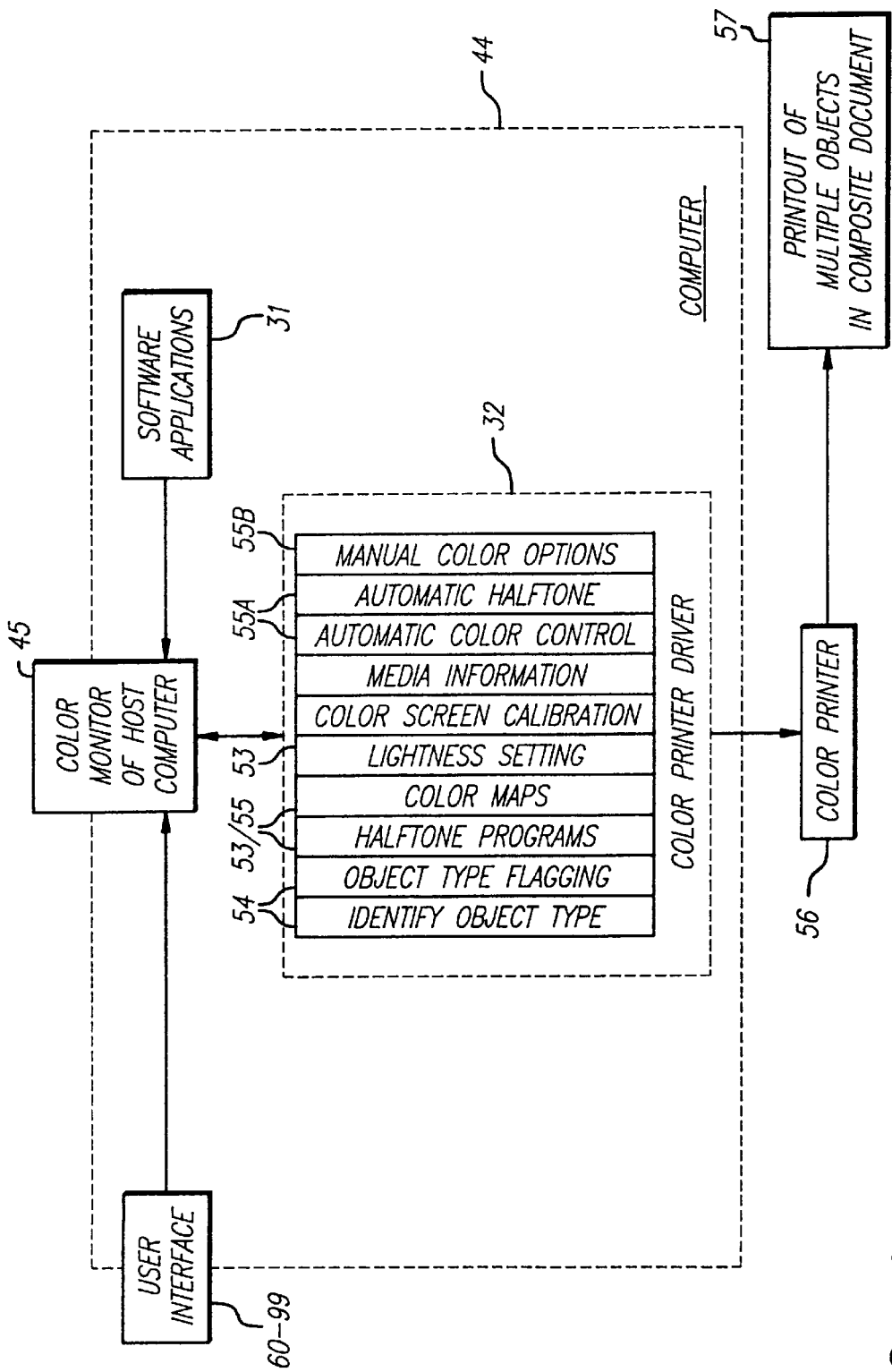
FIG. 1 is a block diagram showing a computer system employing a presently preferred embodiment of the invention.
Figure 2:
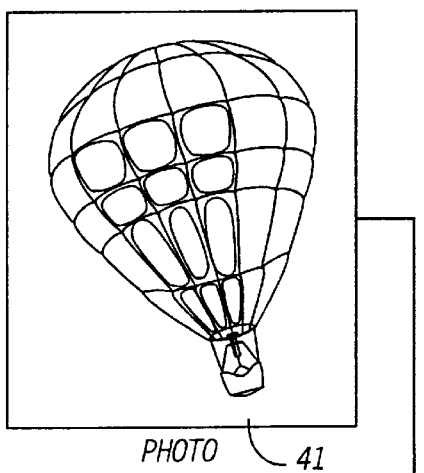
FIGS. 2 and 3 are a flow chart showing how the automatic and manual options of FIG. 1 are used to produce a color printout of a composite document.
Figure 2:
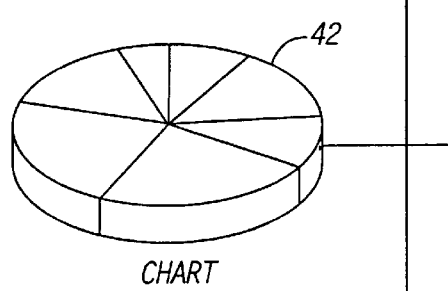
Figure 2:
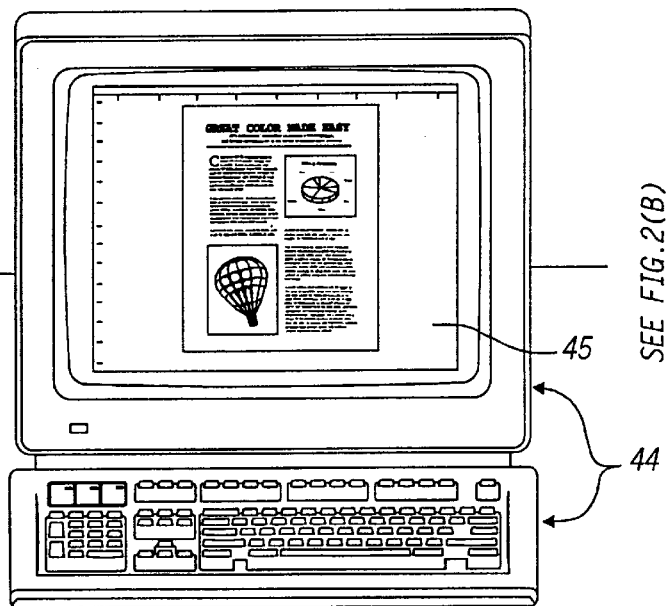
Figure 2:
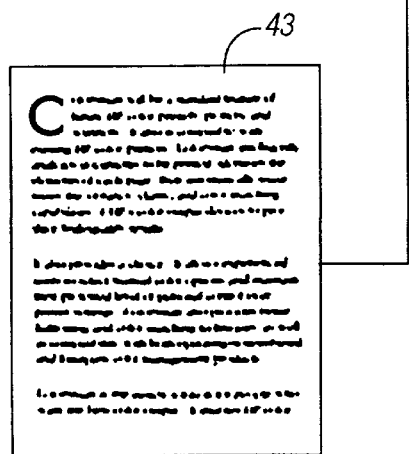
Figure 2:
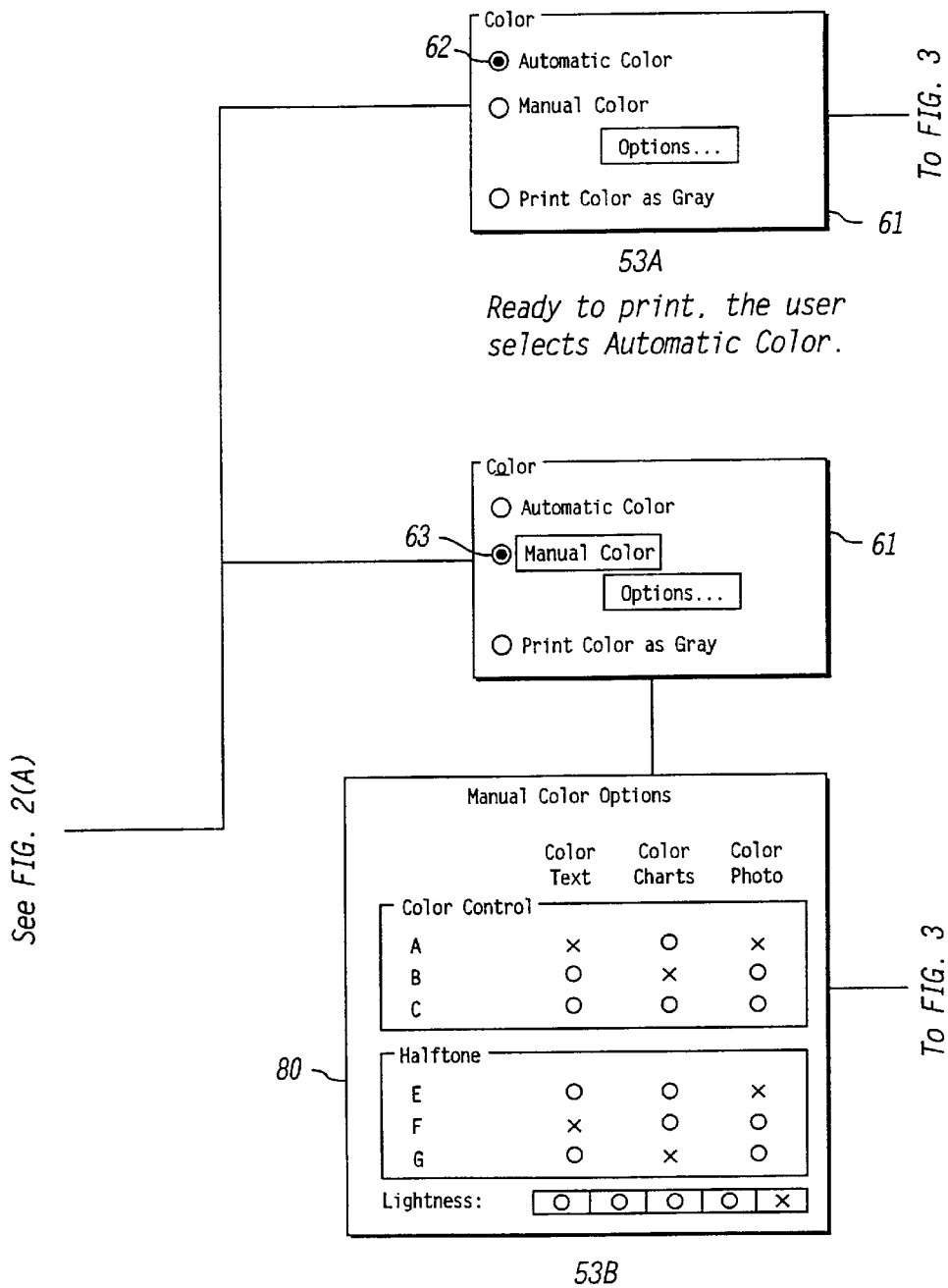
Figure 3A:
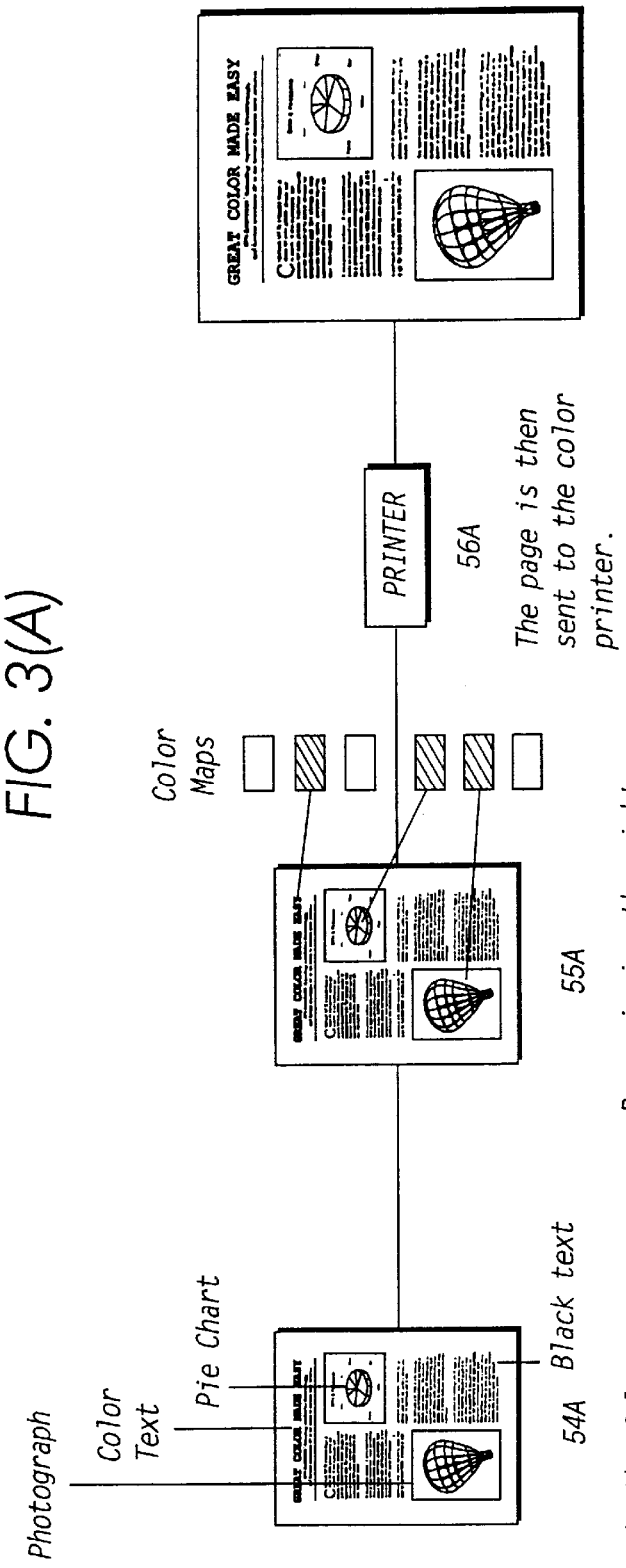

Generally speaking, the invention provides improved print quality for composite documents which have different types of objects to be printed in the same document and in many instances on the same page. In an exemplary printer system as illustrated in the drawings, one or more different types of color objects are identified and flagged, a preferred rendering option such as halftoning and/or color matching is selected for each one of such different color object types, and then the document is printed in accordance with the rendering options selected for each of such different color object types. The color inkjet system of the preferred embodiment includes a printer coupled through a printer driver to a host computer. A default halftoning technique and a default color matching map are incorporated in the printer system for automatic invocation whenever a particular color object type is printed.

The invention has features which provide either automatic or manual implementation of various rendering options. For example, in the color inkjet system shown, an interactive user interface allows a choice between one button automatic control of color output or multi-button control of color output, with both automatic and manual options providing independent control for color halftone and for color correction based on the types of objects to be printed. The preferred form allows separate print rendering options for text, graphics and photo images.

Different print quality modes in the printer invoke different print rendering options for a particular object to be printed. In the exemplary embodiment, a printer control automatically invokes an error diffusion halftoning technique for photo images whenever high quality modes is designated, and automatically invokes a dither halftoning technique for photo images whenever a normal or fast print mode is designated.

It is important to note the the location of the color management functionality is somewhat flexible withint the printer system. Such functionality in the presently preferred version of the invention is primarily in the printer driver, but it could be implemented in the printer driver and/or printer firmware and/or even in the printer hardware (e.g., custom ICs, etc.).

Figure 11:
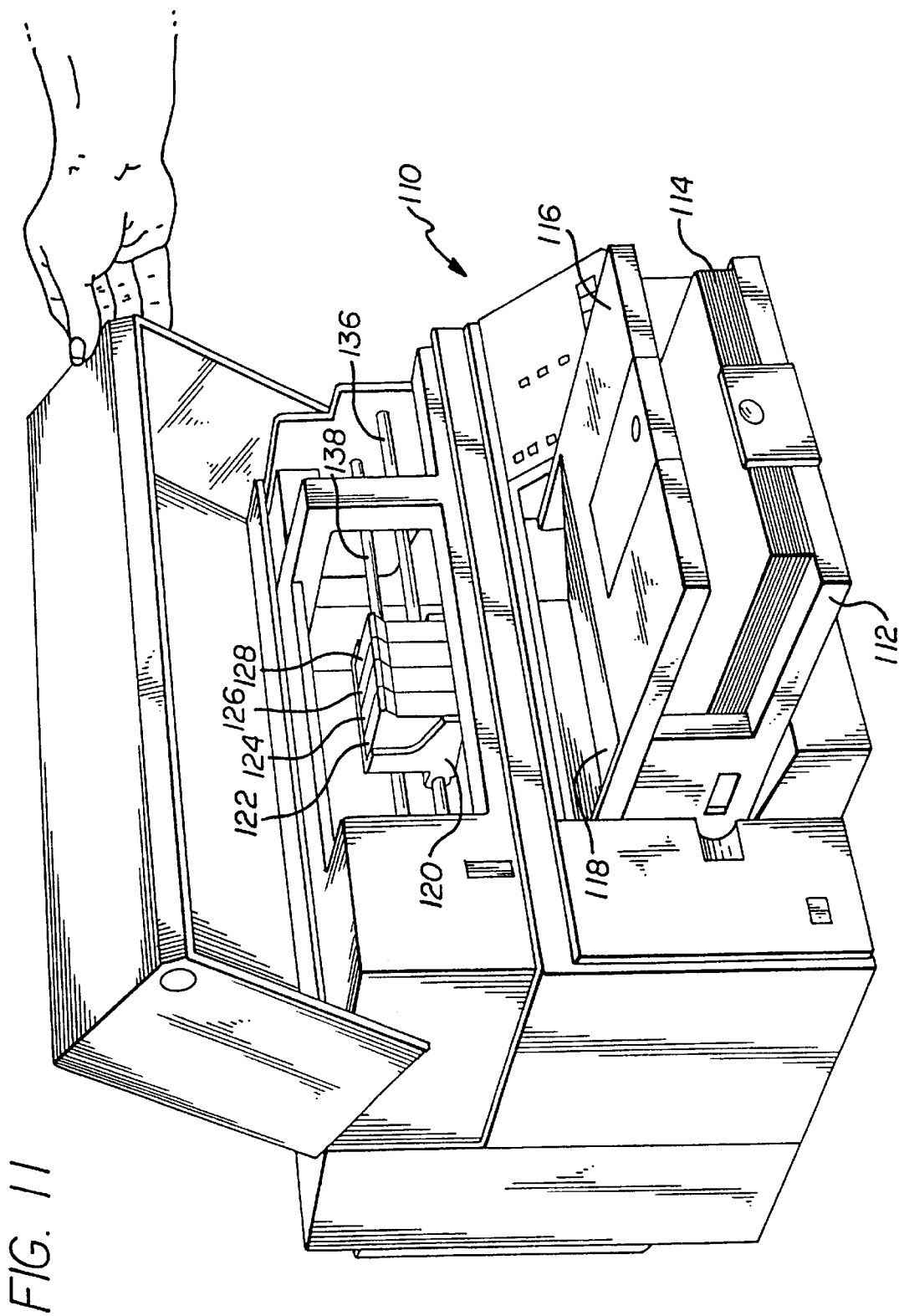
FIGS. 11 and 12 show a typical color inkjet printer for incorporating the color printout features of the present invention.
Figure 12:
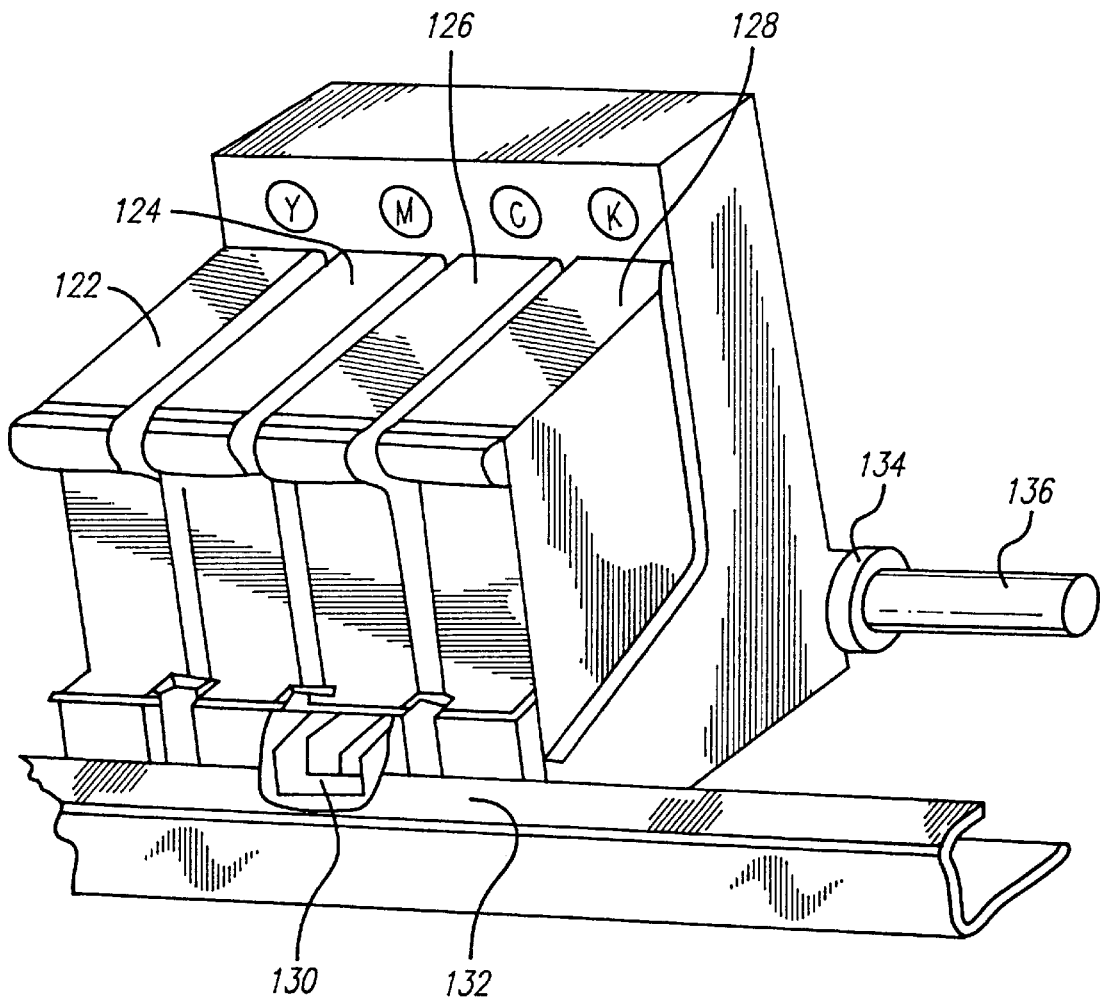

The embodiment of the invention is used in an inkjet printer of the type shown in FIG. 11. In particular, inkjet printer 110 includes an input tray 112 containing sheets of media 14 which pass through a print zone, and are fed past an exit 18 into an output tray 116. Referring to FIGS. 11–12 a movable carriage 120 holds print cartridges 122, 124, 126, and 128 which respectively hold yellow (Y), magenta (M), cyan (C) and black (K) inks. The front of the carriage has a support bumper 130 which rides along a guide 132 while the back of the carriage has multiple bushings such as 134 which ride along slide rod 136. The position of the carriage as it traverses back and forth across the media is determined from an encoder strip 138 in order to be sure that the various ink nozzles on each print cartridge are selectively fired at the appropriate time during a carriage scan.

Figure 4:
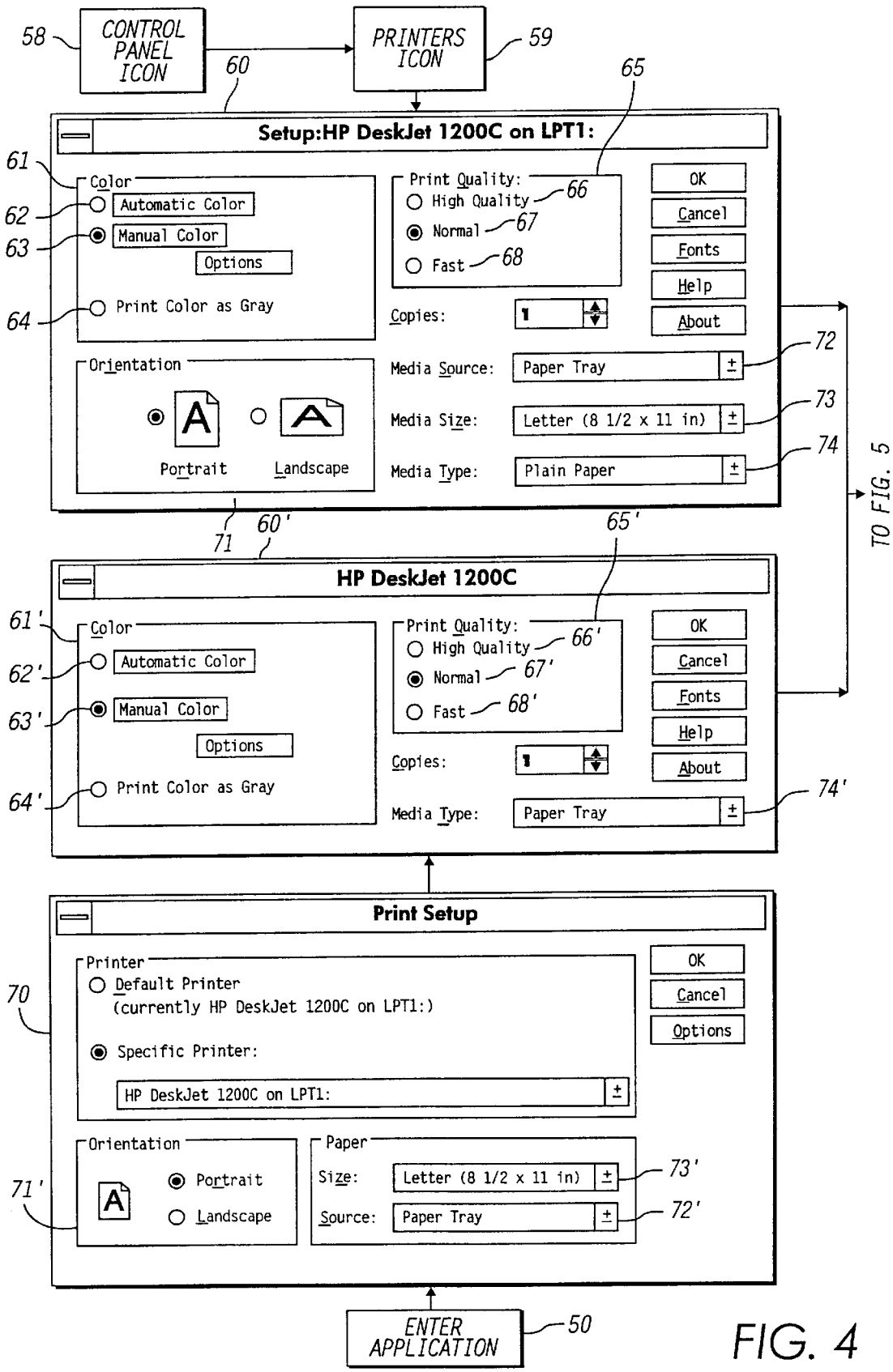
FIGS. 4 and 5 show a sequence of interactive computer screens available to a user who proceeds through the flow chart of FIGS. 2 and 3.

In Windows 3.1, Microsoft developed the notion of a common print dialog as shown in FIG. 4. This is called from the application of Windows directly. When this dialog is used, some Setup Dialog features have been addressed (namely Orientation, Paper Size, and Paper Source) and therefore do not need to be presented to the user again in the driver's Setup Dialog. With this in mind, the driver will only display the modified version of the Setup Dialog when the driver is called from the common print dialog.

Figure 5:
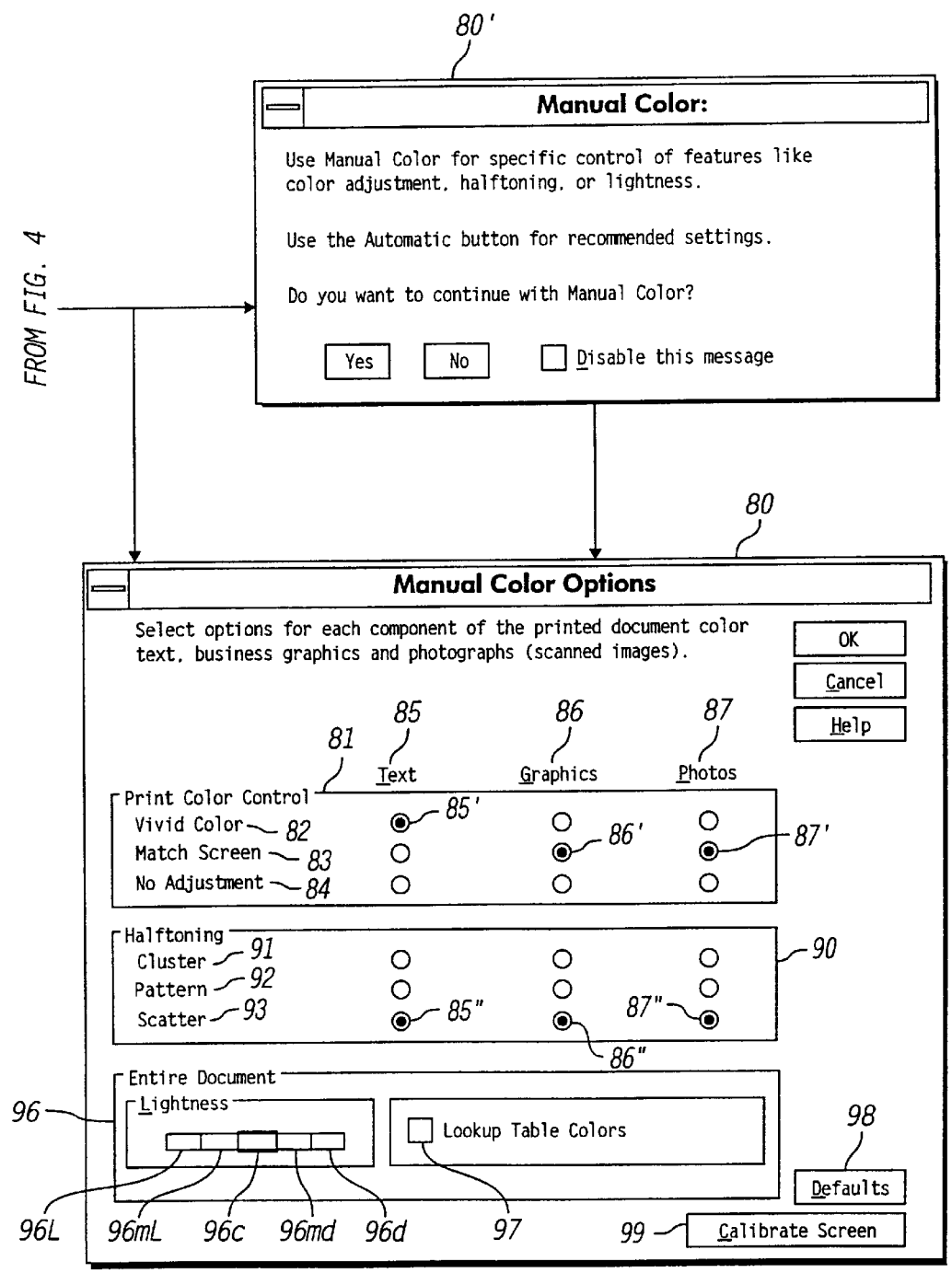
Figure 6:
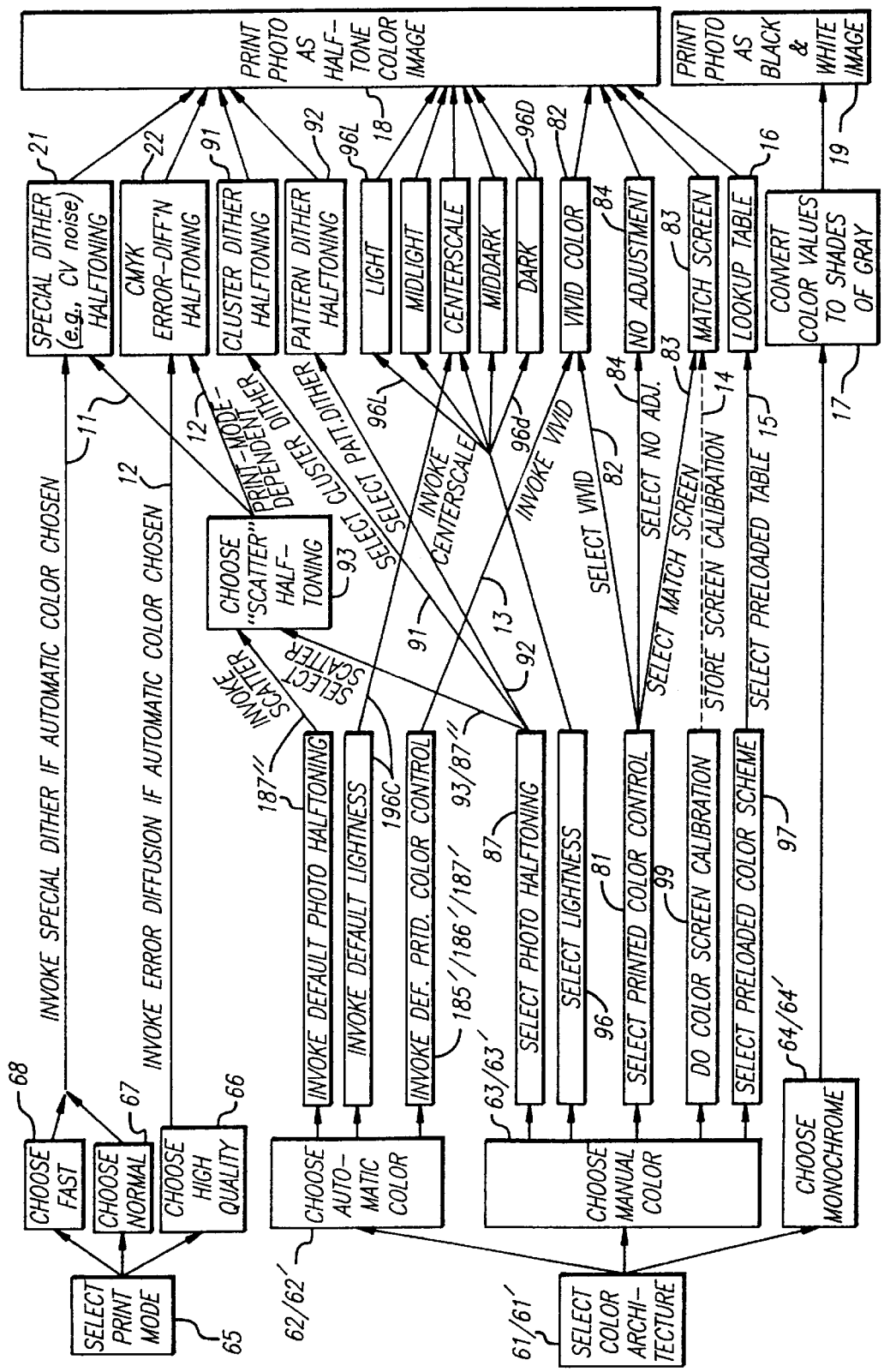
FIG. 6 is a schematic block diagram for producing color photo printouts in accordance with the preferred embodiment of FIG. 1.
Figure 7:
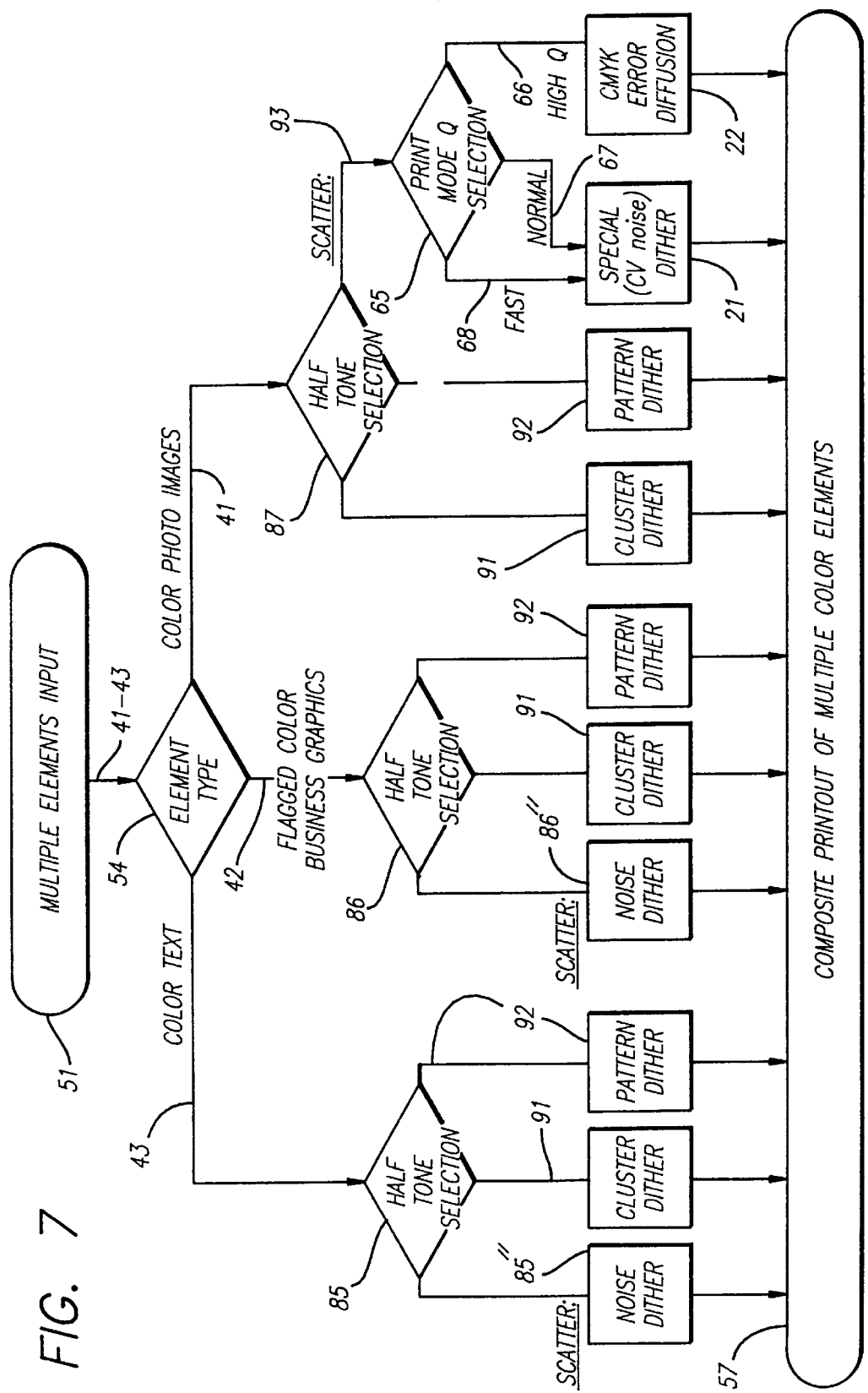
FIG. 7 is a halftone flow chart for the preferred embodiment of FIG. 1.
Figure 8:
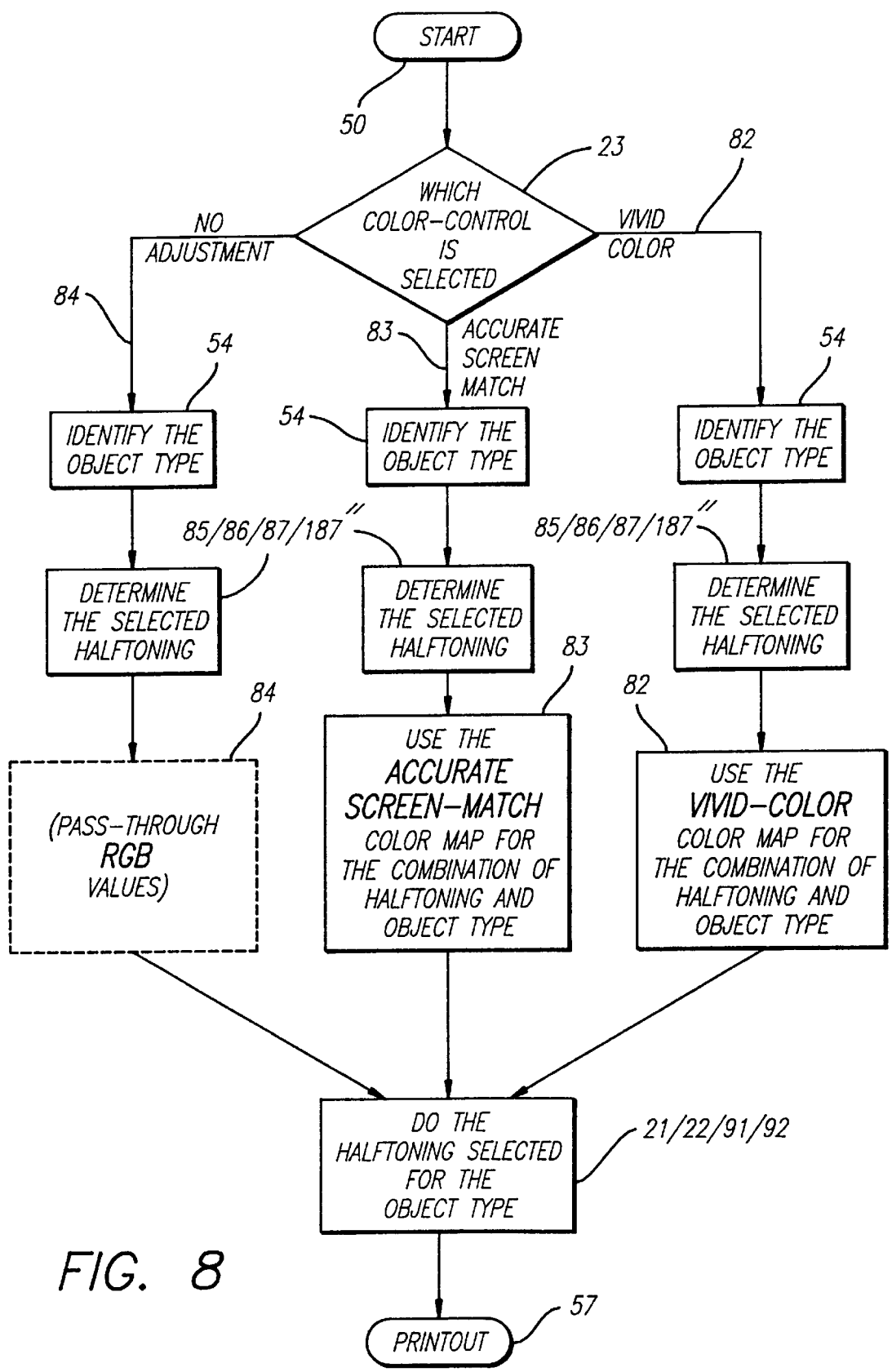
FIG. 8 is a color control flow chart for the preferred embodiment of FIG. 1.

As shown in FIG. 5, the user options presented in the Manual Color Options are divided into two categories. The first category contains the Printed Color Control and the Half toning method. These options can be selected on an object-by-object basis (the objects in this case are text, graphics and photo objects). In other words, the Printed Color Control can be put into a different mode for text as for graphics and also for photographic-type images. The Half toning method can also be different for the three different types of objects.

The second category contains the Lightness slider and the Pantone Color mode. These options can be set only on a job-by-job basis. This means that the Lightness and Pantone mode act upon the entire job regardless of what type of objects are in each job (or on each page of the job).

The driver will adjust the incoming RGB data by applying a gamma correction to produce the adjusted RGB data in the following manner:

LIGHTNESS SLIDER TABLE

| | Lightest | Lighter | Normal | Darker | Darkest |
|---|---|---|---|---|---|
| Accurate Match | Gamma: 0.5 | Gamma: 0.7 | Gamma: 1.0 | Gamma: 1.2 | Gamma: 1.4 |
| Clear and Vibrant | Gamma: 0.5 | Gamma: 0.7 | Gamma: 1.0 | Gamma: 1.2 | Gamma: 1.4 |
| No Adjustment | Gamma: 0.3 | Gamma: 0.4 | Gamma: 0.6 | Gamma: 0.8 | Gamma: 1.0 |

Pantone characterized both the DJ 1200C and PJ XL300 to create a Pantone lookup table to be incorporated into the driver. When this mode is selected, the driver will check all incoming RGB values against the key values provided by Pantone. If there is an exact match, then the driver will map the incoming RGB value into the correct (according to Pantone) RGB value to send to the printer to produce the closest approximation of the Pantone color selected.

Only Plain Paper (on the DJ 1200C) has been Pantone certified (and Special Paper on the PJ XL300). If the user attempts to check the Pantone checkbox when the appropriate media type is not selected, a warning message appears.
Defaults Button
This button will reset all the user options in this dialog back to the factory default position for the mode. These defaults are shown on the Manual Color Options Dialog.
Calibrate Screen Button
Brings up the Calibration utility. The user will use this when he/she wants to recalibrate the monitor in order to build new maps for the Accurate Screen Match mode.

The matrices below show the type of color matching and half toning that is implemented in the driver for the various user-selectable options in this dialog. The following are definitions of the matrix entries.
HMS Type Color Map
Used to boost the vibrancy of the hue associated with the given RGB value.

Accurate Color Map

Created when a user calibrates his/her monitor with screen calibration in order to get printed output that matches what's on the user's screen.

No Adjustment

The driver does not do any processing of incoming RGB data. This is the mode that users may utilize in order to control exactly the RGB values that are sent to the printer.

HPL Noise with CV

This Half toning option utilizes a 128×128 byte Noise dither matrix along with conversion of the RGB data into Color Vector (CV) data. This provides closer to Error Diffusion quality with about the speed of normal dithering. (Used when in Fast/Normal printing mode and scatter half toning is selected.)

HPL noise is disclosed in Ser. Nos. 57,244 and 60,285

HPL noise with CV is disclosed in Atty Dockets 1094173-1 and 1094230-1 filed concurrently herewith.

CMYK error diffusion is disclosed in Atty docket 1094210-1 filed concurrently herewith.

CMYK Err Diff

This Half toning option utilizes a CMYK Error Diffusion algorithm. This provides the highest quality output (for photographic images only) although it is the slowest half toning method. (Used when in High Quality printing mode and scatter half toning is selected.)

Current Cluster Dither

This is the same Cluster dither that is currently in the DJ 1200C and PJ XL300. This method is faster than Error Diffusion and provides good edge definition for text and graphics, Current Bayer Dither This is the same Pattern dither that is in the DJ 1200C and PJ XL300 currently. This method is the same speed as Cluster dither and has been preferred by some users The following tables outline the type of color map and half toning used for the various U/I settings.

TABLE

Printed Color Control/Half toning matrix for TEXT & GRAPHICS

|  |  | Clear and Vivid | Accurate Match | No Adjustment |
|---|---|---|---|---|
| Scatter | HMS color map (#1) HPL Noise | Accurate map (#8) HPL Noise | RGB pass-through HPL Noise |
| Cluster | HMS color map (#2) Current Cluster dither | Accurate map (#9) Current Cluster dither | RGB pass-through Current Cluster dither |
| Pattern | HMS color map (#3) Current Bayer dither | Accurate map (#10) Current Bayer dither | RGB pass-through Current Bayer dither |

TABLE

Printed Color Control/Half toning matrix for PHOTOGRAPHIC Images

|  |  | Clear and Vivid | Accurate Match | No Adjustment |
|---|---|---|---|---|
| Scatter | HMS color map #(4,5) HPL Noise with CV or CMYK Err. Diff | Accurate map (#8,11) HPL Noise with CV or CMYK Err. Diff | RGB pass-through HPL Noise with CV or CMYK Err. Diff |
| Cluster | HMS color map #(6) Current Cluster dither | Accurate map (#9) Current Cluster dither | RGB pass-through Current Cluster dither |
| Pattern | HMS color map #(7) Current Bayer dither | Accurate map (#10) Current Bayer dither | RGB pass-through Current Bayer dither |

There are two possible implementations of Scatter for Photos. One is the HPL Noise dither with CV. This will be the default since it is fast and gives better output quality for raster images (when compared to cluster or pattern). The other implementation is CMYK Error Diffusion which provides even better quality, but with a significant degradation in performance. The selection will be based on the user interface Print Quality mode. High Quality will map to CMYK Error Diffusion and Fast/Normal will map to CV Noise.

The total number of maps needed is shown also in the matrices above. There will be 11 maps needed for all the combinations of color matching modes and half tone methods.

This is a significant increase in the number of maps shipped and will definitely put the space required for installation above the amount that can fit onto one disk. Therefore, the decision has been made to ship the driver on 2 disks. order to accommodate this.

Figure 9:
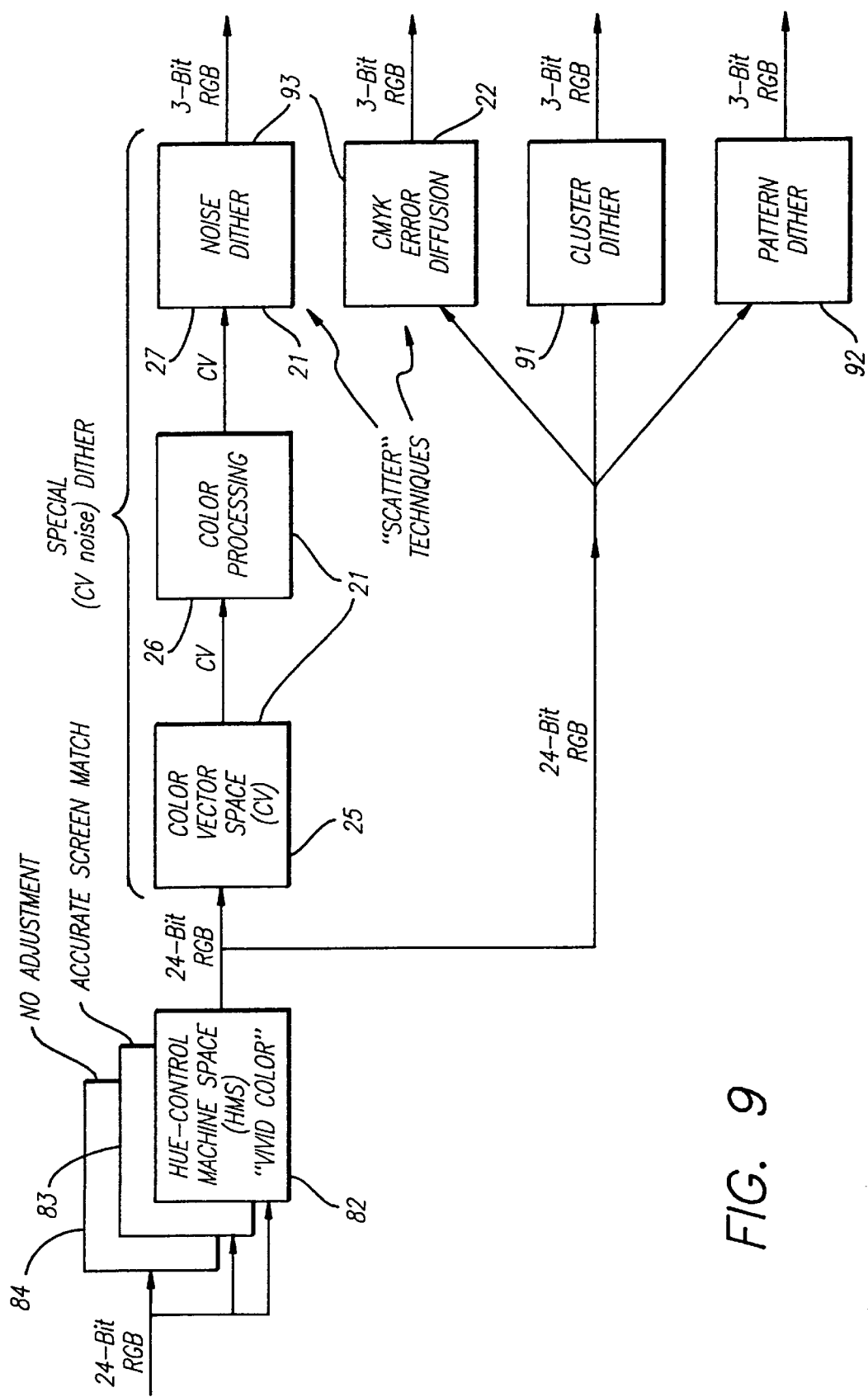
FIG. 9 is a functional block diagram showing the relationship of color control and halftoning in processing and printing photographic images.
Figure 10:
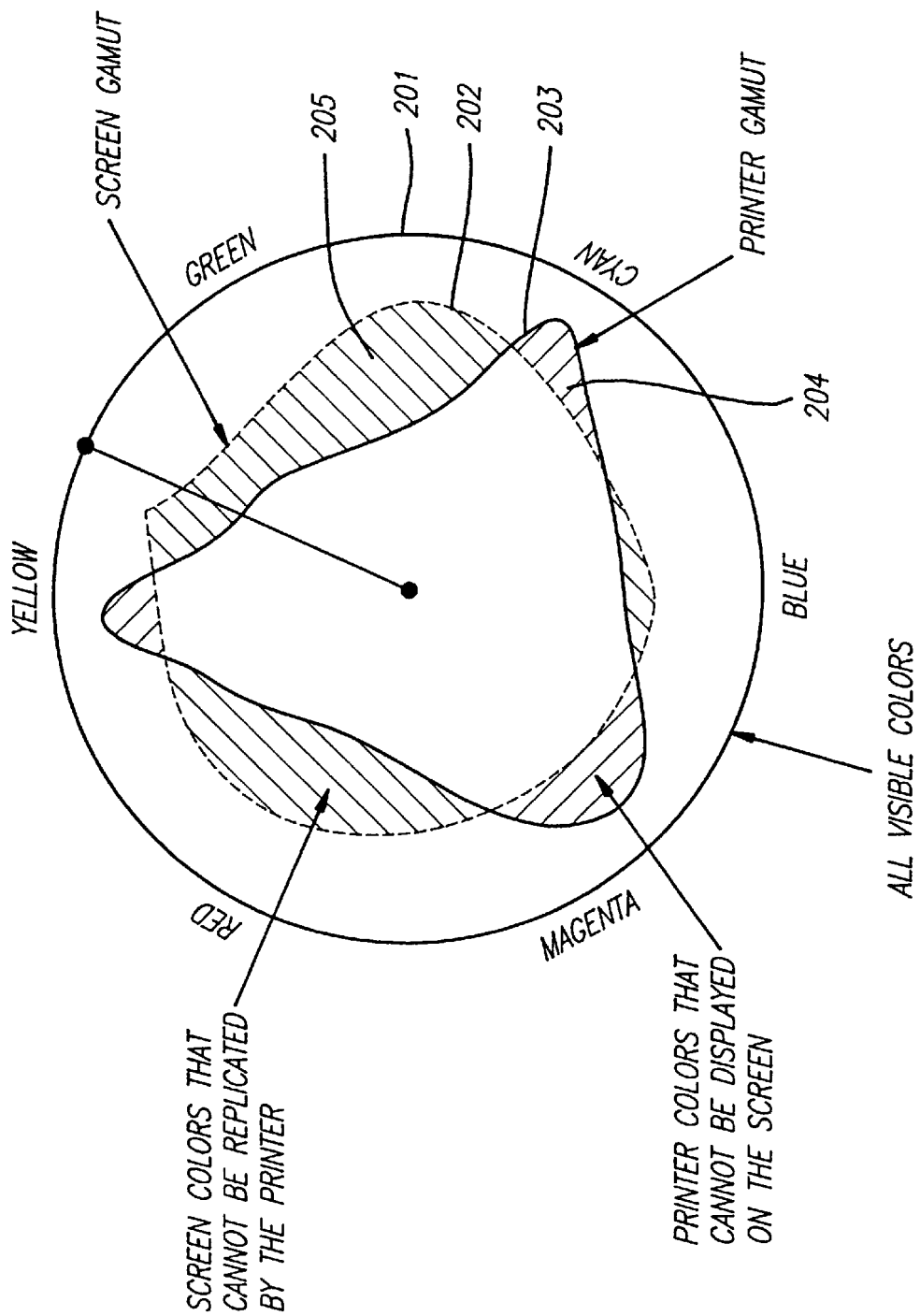
FIG. 10 is a schematic diagram showing the different color gamuts of visible light, a computer screen, and a printer which are used in the color control flow chart of FIG. 8.

As the FIG. 9, shows, the input to the whole system is 24 bit RGB, and the output is 3 bit RGB sent to the printer. The steps involved are: choosing one of the color maps (HMS1, Accurate, or none) and mapping the color to another 24 bit RGB value, converting this value to CV Space (in the case of Noise Dither), doing some color processing in CV Space and then Half toning in CV Space. For Cluster, Pattern, and Error Diffusion, the half toning is done in RGB space.

The color matching portion of the color path is always done in the driver. The CV processing and half toning is done either in the driver or in the printer, depending on the type of object being rendered.

The following diagram shows where the different objects are rendered. All objects that are not already rendered in the application (which is most objects) are either rendered in the Windows driver or in the PCL5 F/W on the printer.

| Type of Object | Where it is rendered |
|---|---|
| All Text Objects | Printer |
| All Graphics Objects (Squares, Circles, . . . Business Graphics) | Printer |
| 1, 4, 8-bit photo-type images (Cluster & Pattern half tone) | Printer |
| 1, 4, 8-bit photo-type images (Scatter half tone - Noise & Err. Diff.) | Windows Driver |
| All 24-bit photo-type images | Windows Driver |

For objects that are rendered in the printer the object is sent down from the Windows driver to the printer with 24-bit RGB values associated to it. Color processing is done in the driver (Color Matching, Lightness Slider, and Pantone Match) before the final RGB value is sent to the printer. Based on the user's half toning selections in the UI, a PCL command is also sent to the printer to set the appropriate rendering mode in the printer. The printer is then responsible for rendering all the objects and, in some cases, for scaling raster images.

The only objects that are rendered in the Windows driver are photo-type images that use the Scatter half tone, (because not all the printers support the Scatter mode and 24-bit photo-type images. The reason the Scatter half tone is rendered in the driver is because not all the printers support the Scatter mode and the only way to support both error diffusion and Noise dither on all the printers is to provide it in the driver. The 24-bit images are rendered in the driver regardless of the half toning mode in order to minimize the amount of data sent over the I/O. Each 24-bit RGB pixel can be half toned down to 3-bits per pixel which provides an automatic 8-to-1 compression in addition to the PCL compression on those 3-bits.

It will thus be appreciated from the foregoing description that many improvements are provided by the present invention. In the past users have only have limited control in the selection of rendering options and color correction options. That is, they have been limited to choosing one particular rendering option and/or one particular color correction option for an entire document, With the present invention, it is now possible for users to select an independent rendering option and independent color correction option for each type of object (e.g., text, business graphics, and photographic images). For example, in the printer driver dialog screens shown in the drawings, a user can select a Scatter halftone for photographic images, a Pattern halftone for business graphics, and a Cluster halftone for text.

In addition, color correction options can be chosen for each object type independently of the halftone. This independent control for halftone and color correction for each object gives the user a multitude of options and very fine control of the quality and appearance of the printed output. With the ability to render and color correct objects based on their particular type, it is possible to pre-determine which halftone and which color correction option would be best for each object type. Thus, the invention provides an automatic default that produces the best quality output for most users of a particular printer, as well as a manual default that can be changed by the user.

Furthermore, another printout quality feature can be automatically implemented as a default in the printer system. For example, in the preferred embodiment it was determined that users prefer a particular error diffusion halftoning over other kinds of dither halftoning. This has been implemented in the print quality printmode options of the type used by many manufacturers. Such printmode options allow users to choose settings such that the printer technology itself could be optimized for either fast output or higher quality output. It was discovered that this option could also be used to make the same kind of tradeoff within the printer driver itself, and in particular solved the problem of which halftoning method to used for certain complex objects like photographic images. Thus, if the user chooses a print quality setting of "high quality", the driver will perform CMYK error diffusion to render all raster images (e.g., photographic images), while settings of "Normal" or "Fast" for the printmodes will cause the driver to perform noise dithering on all raster images.

While various examples and embodiments of the invention have been shown and described, it will be appreciated by those skilled in the art that the spirit and scope of the invention is not limited to the specific description and drawings herein, but extends to various modifications and changes all as set forth in the following claims.

We claim as our invention:

1. A method of controlling the quality of printing a composite document having objects of different object types to be printed, wherein selection of printing-quality or printing-speed modes, which allocate printing of pixels as among passes or nozzles of a scanning printhead, is used to automatically control methods of rendition as well; said method comprising the steps of:

providing a plurality of different selectable print modes, namely and specifically printing-quality modes or printing-speed modes, or both, to allocate printing of pixels as among passes or nozzles of a scanning printhead;

automatically distinguishing a plurality of different object types any of which may be in such composite document, including distinguishing at least one particular given object of a particular given one type;

developing a designation of one of said plurality of print modes, to be used in printing;

in response to said designation-developing step, automatically selecting said designated print mode for use in printing;

for printing said one particular given object of said particular given one type, either:

invoking a first print-rendering option, namely and specifically a first method for establishing what colors will be printed at each elemental position of said object, if said object is to be printed in a first print mode; or alternatively invoking a second print-rendering option, namely and specifically a second method for establishing what colors will be printed at each elemental position of said object, if said object is to be printed in a second print mode; and then automatically rendering and printing, using whichever of said first or second print modes whose designation was developed in the designation-developing step, including rendering and printing said one particular given object of said particular given one type using the corresponding first or second invoked rendering option, respectively.

2. The method of claim 1, wherein:

said first-option-invoking step comprises automatically invoking the first print-rendering option if said first print mode is designated in the designation-developing step; and said second-option-alternatively-invoking step comprises automatically invoking the second print-rendering option if said second print mode is designated in the designation-developing step.

3. The method of claim 1, wherein:

said first print mode is a high-quality print mode, and said second print mode has a higher throughput than said first print mode.

4. The method of claim 1, wherein:

said invoking step or said alternatively-invoking step automatically occur when a photo image object is to be printed.

5. The method of claim 4, further including the step of:

automatically also invoking another print-rendering option if an object different from said one type of object is to be printed.

6. The method of claim 4, wherein:

said automatically-invoking step invokes one type of halftoning technique; and said alternatively-invoking step invokes a different type of halftoning technique.

7. The method of claim 6, wherein:

said invoking step or said alternatively-invoking step occurs automatically whenever said first or second print mode is designated, respectively.

8. The method of claim 6, wherein:

said invoking step invokes an error-diffusion halftoning technique; and said alternatively-invoking step invokes a dither halftoning technique.

9. The method of claim 1, wherein:

said providing step includes providing a color printing system having different print modes.

10. The method of claim 9, wherein:

said providing step includes providing a color inkjet printing system.

11. The method of claim 1, wherein:

said alternatively-invoking step includes invoking a second print-rendering option for said one type of object to be printed in a third as well as a second print mode.

12. The method of claim 1, for automatic interactive use by a human operator and wherein:

said designation-developing step comprises receiving from such human operator a manually entered designation of printing mode for at least said particular given object of said particular given type;

such human operator manually enters designation of said first or second printing mode, respectively, for at least said particular given object of said particular given type; and said automatically-invoking step, and said automatically-rendering-and-printing step, proceed in accordance with said manually entered designation, using said manually designated first or second print mode and corresponding first or second automatically-invoked rendering option, respectively.

13. The method of claim 1, wherein:

said designation-developing step comprises developing a designation of a print mode for use in printing such entire composite document;

said automatically-selecting step comprises automatically selecting, for use in printing such entire composite document, said print mode whose designation has been developed in the designation-developing step; and said automatically-rendering-and-printing step comprises automatically rendering and printing such entire composite document using said designated print mode, including rendering and printing said one particular given object of said particular given one type using said designated print mode and using the corresponding automatically-invoked rendering option.

14. The method of claim 13, for automatic interactive use by a human operator and wherein:

said designation-developing step comprises receiving from such human operator a manually entered designation of a printing mode for such entire composite document; and such human operator manually enters designation of a printing mode for such entire composite document; and said automatically-rendering-and-printing step comprises automatically rendering and printing said one particular given object of said particular given one type using said operator-manually-designated print mode, and using the corresponding automatically-invoked rendering option.

15. A printing system for printing a composite document having a plurality of objects of different object types, wherein selection of printing-quality or printing-speed modes, which allocate printing of pixels as among passes or nozzles of a scanning printhead, is used to automatically control methods of rendition as well as print-quality or printing-speed modes; said system comprising:

a color printer for printing such a composite document with a plurality of objects of different object types;

printer-control means including a user interface operatively coupled to said printer for giving a user an option of selecting a print mode, namely and specifically a printing-quality mode or a printing-speed mode or both, to allocate printing of pixels as among passes or nozzles of a scanning printhead, from at least two different print modes; and color-management means, connected to said color printer and said printer-control means, for invoking different print-rendering options, namely and specifically methods for establishing what colors will be printed at each elemental position of each of said objects, for an object of at least one certain object type whenever one or the other of said at least two different print modes, respectively, is selected.

16. The printing system of claim 15, wherein:

said color-management means automatically invoke said different print-rendering options.

17. The printing system of claim 15, wherein:

said different print-rendering options include two different halftone techniques.

18. The printing system of claim 17, wherein:

said different print-rendering options include an error-diffusion technique and a dither technique.

19. The printing system of claim 17, wherein:

said certain object constitutes a photograph-like image.

20. A color inkjet printing system for forming an image on a print medium, and wherein selection of printing-quality or printing-steed modes, which allocate printing of pixels as among passes or nozzles of a scanning printhead, is used to automatically control methods of rendition as well as print-quality or printing-speed modes; said system comprising:

a host computer having a monitor screen;

print-driver software operating in the computer;

a color inkjet printer coupled to the print-driver software operating in the computer;

a user interface connected to said color inkjet printer including options for selecting any of a plurality of print modes, namely and specifically printing-quality modes or printing-speed modes or both, to allocate printing of pixels as among passes or nozzles of a scanning printhead; and color-management means interconnected with said color inkjet printer, with said print driver and with said user interface, for automatically invoking and using:

a first print-rendering option, namely and specifically a first method for establishing what colors will be printed at each elemental position of said image, with one print mode, and a second print-rendering option, namely and specifically a second method for establishing what colors will be printed at each elemental position of said image, with another print mode.

21. A color inkjet printing system comprising:

a host computer having a monitor screen;

print-driver software operating in the computer;

a color inkjet printer coupled to the print-driver software operating in the computer;

a user interface connected to said color inkjet printer including options for selecting any of a plurality of print modes; and color-management means interconnected with said color inkjet printer, with said print driver and with said user interface, for automatically invoking and using:

a first print-rendering option with one print mode, and a second print-rendering option with another print mode; and wherein said first and second print-rendering options are different from each other and are invoked for printing different objects of the same object type.

22. The printing system of claim 20, wherein:
said first and second print-rendering options are invoked for printing color photograph-like images.

23. The printing system of claim 21, wherein:
said first and second print-rendering options are halftoning techniques for printing photograph-like images.

24. A method of facilitating the printing an image, comprising:

automatically invoking a print-rendering option in a given print mode; and automatically invoking another print-rendering option in another given print mode;

wherein said print-rendering option and said another print-rendering option are substantially different from one another and are invoked for printing different objects of the same object type on a print medium.

25. A method of printing an image according to claim 24, wherein said step of automatically invoking said print-rendering option includes:

determining each elemental position of said image; and establishing in said given print mode what colors will be printed at each determined elemental position of said image.

26. A method of printing an image according to claim 25, wherein said step of automatically invoking said another print-rendering option includes:

establishing in said another given print mode what colors will be printed at each determined elemental position of said image.

27. A method of printing an image according to claim 24, wherein said given print mode is at least one of a printing-quality mode and a printing-speed mode to facilitate the allocating of printing of pixels as among passes or nozzles of a scanning Printhead in an inkjet printer.

28. A method of printing an image according to claim 27, wherein said another given print mode is at least one of another printing-quality mode and another printing-speed mode to facilitating allocating of printing of pixels as among passes or nozzles of said scanning Printhead.

29. A method of printing an image according to claim 24, further comprising:

developing a designation of one of a plurality of print modes to be used in printing;

wherein said plurality of print modes includes at least said given print mode and said another given print mode.

30. A method of printing an image according to claim 29, further comprising:

selecting any one of said print mode and said another print mode to automatically control image rendition of the objects of different object types.

31. In an inkjet printer, a color management printing system, comprising:

means for automatically invoking a print-rendering option in a given print mode; and means for automatically invoking another print-rendering option in another given print mode, wherein said print-rendering option and said another print-rendering option are substantially different from one another and are invoked for printing different objects of the same object type on a print medium.

* * * * *